United States Patent
Matsumoto et al.

(10) Patent No.: US 10,898,850 B2
(45) Date of Patent: Jan. 26, 2021

(54) AIR PURIFICATION DEVICE FOR VEHICLE

(71) Applicant: HONDA MOTOR CO., LTD., Tokyo (JP)

(72) Inventors: Subaru Matsumoto, Wako (JP); Shinji Kakizaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 181 days.

(21) Appl. No.: 16/183,191

(22) Filed: Nov. 7, 2018

(65) Prior Publication Data
US 2019/0160417 A1 May 30, 2019

(30) Foreign Application Priority Data
Nov. 30, 2017 (JP) .................... 2017-230699

(51) Int. Cl.
*B60H 3/00* (2006.01)
*B01D 53/04* (2006.01)
(Continued)

(52) U.S. Cl.
CPC ..... *B01D 53/0462* (2013.01); *B01D 53/0415* (2013.01); *B01D 53/0446* (2013.01);
(Continued)

(58) Field of Classification Search
CPC ........... B01D 53/0415; B01D 53/0446; B01D 53/0454; B01D 53/0462; B01D 2257/504;
(Continued)

(56) References Cited

U.S. PATENT DOCUMENTS 4,046,529 A * 9/1977 Fletcher .................. A62B 11/00
96/127
4,376,408 A * 3/1983 Iijima ................ B60H 1/00207
454/140
(Continued)

FOREIGN PATENT DOCUMENTS

JP    H05277327 A    10/1993
JP    H09175164 A    7/1997
(Continued)

OTHER PUBLICATIONS

Notice of Reasons for Refusal for JP Application No. 2017230699, dated Jul. 16, 2019, 4 pages.

*Primary Examiner* — Frank M Lawrence, Jr.
(74) *Attorney, Agent, or Firm* — Armstrong Teasdale LLP

(57) ABSTRACT

An air purification device includes: a carbon dioxide removal device configured to sorb and remove carbon dioxide contained in air; an air supply duct connected to a first outlet of the carbon dioxide removal device and having a blowing opening 17*a* for flowing out purified air from which carbon dioxide has been removed by the carbon dioxide removal device 12 into a vehicle cabin; and an exhaust duct connected to a second outlet of the carbon dioxide removal device and having an exhaust opening 18*a* for discharging the carbon dioxide sorbed by the carbon dioxide removal device to outside of the vehicle cabin 3, wherein the air supply duct is mounted to a front seat of the vehicle so as to be movable vertically with the blowing opening facing forward.

7 Claims, 6 Drawing Sheets

(51) Int. Cl.
*B60H 1/03* (2006.01)
*B60H 1/14* (2006.01)
*B60H 1/00* (2006.01)
*B60N 2/56* (2006.01)
*B60H 3/06* (2006.01)

(52) U.S. Cl.
CPC ..... *B01D 53/0454* (2013.01); *B60H 1/00321* (2013.01); *B60H 1/00492* (2013.01); *B60H 1/034* (2013.01); *B60H 1/039* (2019.05); *B60H 1/143* (2013.01); *B60H 3/0085* (2013.01); *B60H 3/06* (2013.01); *B60H 3/0633* (2013.01); *B60N 2/5621* (2013.01); *B01D 2253/108* (2013.01); *B01D 2257/504* (2013.01); *B01D 2257/80* (2013.01); *B01D 2258/06* (2013.01); *B01D 2259/40009* (2013.01); *B01D 2259/4566* (2013.01); *B60H 1/00285* (2013.01); *B60H 2003/0691* (2013.01)

(58) Field of Classification Search
CPC ............ B01D 2257/80; B01D 2258/06; B01D 2259/4566; B60N 2/5621; B60H 1/00285; B60H 1/00321; B60H 1/00492; B60H 1/034; B60H 1/039; B60H 1/143; B60H 2003/0691; B60H 3/0085; B60H 3/06; B60H 3/0633; B60H 3/0608
USPC ............................. 55/385.3; 95/139; 96/108
See application file for complete search history.

(56) References Cited

U.S. PATENT DOCUMENTS

| | | | | |
|---|---|---|---|---|
| 4,551,304 A | * | 11/1985 | Holter | ................ B01D 53/0438 165/61 |
| 4,711,159 A | * | 12/1987 | Armbruster | ............ B60H 1/247 454/137 |
| 5,681,218 A | * | 10/1997 | Kishi | ................... B60H 3/0085 454/139 |
| 10,507,424 B1 | * | 12/2019 | Muller-Hellwig | ... B60H 3/0608 |
| 2005/0282486 A1 | * | 12/2005 | Takeda | ................... B60H 1/247 454/158 |
| 2009/0318068 A1 | | 12/2009 | Iida et al. | |
| 2012/0241127 A1 | | 9/2012 | Watanabe | |
| 2016/0288043 A1 | * | 10/2016 | Meirav | ................... B01D 53/72 |
| 2017/0087963 A1 | | 3/2017 | Tajima et al. | |
| 2017/0217284 A1 | | 8/2017 | Ji et al. | |
| 2017/0327058 A1 | | 11/2017 | Takezawa | |
| 2019/0337429 A1 | * | 11/2019 | McElroy | ............. B60N 2/5657 |

FOREIGN PATENT DOCUMENTS

| | | |
|---|---|---|
| JP | H106765 A | 1/1998 |
| JP | 2000060948 A | 2/2000 |
| JP | 2000335236 A | 12/2000 |
| JP | 2005306271 A | 11/2005 |
| JP | 2005335439 A | 12/2005 |
| JP | 2005335441 A | 12/2005 |
| JP | 2005343425 A | 12/2005 |
| JP | 2006001319 A | 1/2006 |
| JP | 2007106360 A | 4/2007 |
| JP | 2007176238 A | 7/2007 |
| JP | 2008254607 A | 10/2008 |
| JP | 2017178277 A | 1/2017 |
| WO | 2009063848 A1 | 5/2009 |
| WO | 2011071192 A1 | 6/2011 |
| WO | 2015182402 A1 | 12/2015 |
| WO | 2016076097 A1 | 5/2016 |

* cited by examiner

AIR PURIFICATION DEVICE FOR VEHICLE

TECHNICAL FIELD

The present disclosure relates to an air purification device for a vehicle provided with a carbon dioxide removal device for removing carbon dioxide from air.

BACKGROUND ART

WO2009/063848A discloses a ventilating apparatus for a vehicle, which is provided with a temperature detector for detecting a temperature in a passenger compartment, such that when the temperature in the passenger compartment exceeds a specified value in a state where there is no occupant in the passenger compartment, the fan is operated so that the air in the passenger compartment is discharged to the outside of the vehicle. This ventilating apparatus further includes a carbon dioxide concentration sensor disposed underneath a front seat to detect the carbon dioxide concentration in the passenger compartment when the ignition switch is on, such that when the detected carbon dioxide concentration in the passenger compartment exceeds a prescribed reference value, the fan is operated to cause the air in the passenger compartment to be drawn into the exhaust duct from the inlet opening, which faces forward underneath the rear seat, and the air drawn into the exhaust duct is exhausted to the outside of the vehicle via a trunk compartment.

JP2005-306271A discloses an oxygen enrichment device for supplying oxygen enriched air to a vehicle occupant. This oxygen enrichment device includes a main body formed with an air inlet and disposed at the back of the seat or under the seat, and a pair of blower ducts extending from the main body along the back of the seat to have blowing openings located on respective sides of the headrest and facing obliquely forward such that the air flows from the blowing openings meet in front of the face of the occupant to form an oxygen enriched area around the face, whereby oxygen enriched air with an appropriate concentration is supplied to around the face of the occupant, without the air discharged from the nozzles directly impinging upon the nose and mouth of the occupant.

Typically, an air conditioner for an automobile has an outside air introduction mode for admitting outside air into the passenger compartment and an inside air recirculation mode for recirculating the air in the passenger compartment. In the outside air introduction mode, fresh air can be introduced into the passenger compartment, but the temperature-controlled air in the passenger compartment is discharged to the outside of the vehicle, which results in a large loss of thermal energy due to ventilation (ventilation loss). Conversely, in the inside air recirculation mode, because the temperature-controlled air in the passenger compartment is recirculated, the ventilation loss is prevented, but the air in the passenger compartment may have a high carbon dioxide concentration and humidity.

In the ventilating apparatus for a vehicle disclosed in WO2009/063848A, the air in the passenger compartment is discharged to the outside as it is, and outside air is introduced into the passenger compartment along with this. Therefore, when the temperature of the air in the passenger compartment is controlled by the air conditioner, heat of the temperature-controlled air is released to the outside, resulting in a large ventilation loss.

On the other hand, in the oxygen enrichment device disclosed in JP2005-306271A, though the oxygen-enriched air is blown from the blowing openings toward an area in front of the face of the occupant, carbon dioxide is not discharged to the outside of the vehicle. Therefore, when the air conditioner is in the inside air recirculation mode or is not in operation, the carbon dioxide concentration in the passenger compartment increases after a long driving. As a result, even though the oxygen enriched air generated by the oxygen enrichment device is mixed in the air in the passenger compartment, the carbon dioxide concentration can still be high, making it difficult to prevent the driver's concentration drop, drowsiness, and fatigue. Further, when the driver has a physique larger or smaller than a standard physique, the oxygen enriched air may not be supplied to around the face of the driver.

SUMMARY OF THE INVENTION

In view of such background, a primary object of the present invention is to provide an air purification device for a vehicle that can prevent an increase in the carbon dioxide concentration in the passenger compartment (vehicle cabin) for an extended period of time while suppressing the ventilation loss even when the air conditioner is in the inside air recirculation mode or not in operation, and that can supply purified air to around the face of a vehicle occupant (such as a driver) regardless of the physique of the occupant.

To achieve the above object, one embodiment of the present invention provides an air purification device (10) for a vehicle (1), comprising: an air intake duct (16) having one end formed with a suction opening (16a) for sucking air in a vehicle cabin (3); a carbon dioxide removal device (12) that has an inlet (12a) connected to another end of the air intake duct and sorbs and removes carbon dioxide contained in air supplied through the inlet; an air supply duct (17) having one end connected to a first outlet (12b) of the carbon dioxide removal device and another end formed with a blowing opening (17a) for blowing purified air from which carbon dioxide has been removed by the carbon dioxide removal device into the vehicle cabin; and an exhaust duct (18) having one end connected to a second outlet (12c) of the carbon dioxide removal device and another end formed with an exhaust opening (18a) for discharging the carbon dioxide sorbed by the carbon dioxide removal device to outside of the vehicle cabin, wherein the air supply duct (17) is mounted to a seat (5) so as to be movable vertically with the blowing opening (17a) facing forward.

According to this arrangement, air in the vehicle cabin is sucked through the suction opening of the air intake duct into the carbon dioxide removal device, where carbon dioxide is removed from the air, and the purified air is blown from the blowing opening of the air supply duct into the vehicle cabin. The carbon dioxide sorbed (namely, adsorbed and/or absorbed) by the carbon dioxide removal device is discharged from the exhaust opening of the exhaust duct to the outside of the vehicle cabin. Therefore, even when the air conditioner is in the inside air recirculation mode or not in operation, it is possible to prevent an increase in the carbon dioxide concentration in the vehicle cabin for an extended period of time and to suppress the ventilation loss. In addition, because the air supply duct is mounted to the seat so as to be movable vertically with the blowing opening facing forward, purified air can be supplied to around the face of the occupant (such as a driver) in the seat regardless of the physique of the occupant.

In the above arrangement, preferably, the other end of the air supply duct (17) is fixed to a headrest (23) of the seat.

According to this arrangement, when the vehicle occupant (such as a driver) adjusts the height of the headrest to suit the physique of the occupant, the height of the other end (blowing opening) of the air supply duct fixed to the headrest is also adjusted to suit the physique of the occupant. Therefore, there is no need to separately adjust the height of the blowing opening.

In the above arrangement, preferably, the blowing opening (17a) opens forward above the headrest (23).

According to this arrangement, purified air can be supplied to a region in front of the face of the occupant in the seat from above.

In the above arrangement, preferably, the air intake duct (16) includes a pair of air intake ducts provided on respective sides of a seat back (22) of the seat (5), and the suction opening (16a) of each air intake duct opens forward.

According to this arrangement, the air exhaled by the occupant in the seat, which has a high carbon dioxide concentration, is effectively sucked through the suction openings, whereby carbon dioxide can be removed efficiently from the air in the vehicle cabin.

In the above arrangement, preferably, the carbon dioxide removal device (12) is mounted to the seat back (22) of the seat (5).

According to this arrangement, the carbon dioxide removal device can be installed in the vehicle body by installing the seat in the vehicle body. Therefore, the number of steps for installing component parts in the vehicle can be reduced. In the above arrangement, preferably, the air intake duct (16) is provided in a center console (26), and the suction opening (16a) opens forward or downward.

According to this arrangement, because carbon dioxide contained in the air exhaled from the occupant in the driver's seat or the front passenger seat has a higher density than air, carbon dioxide is sucked effectively through the air intake duct provided in the center console, and therefore, carbon dioxide can be removed efficiently from the air in the vehicle cabin.

In the above arrangement, preferably, the suction opening (16a) further opens rearward.

According to this arrangement, the air exhaled by occupants in the rear seat also can be sucked through the suction opening.

In the above arrangement, preferably, the carbon dioxide removal device (12) is provided in the center console (26).

According to this arrangement, the carbon dioxide removal device can be installed in the vehicle body by installing the center console in the vehicle body. Therefore, the number of steps for installing component parts in the vehicle can be reduced. Further, because the carbon dioxide removal device is not mounted to the seat back of the front seat, the carbon dioxide removal device is prevented from being a nuisance to an occupant in the rear seat, and an increase in size of the seat back and a reduction in the cushioning performance are avoided. Namely, it is possible to supply purified air to around the face of the occupant (e.g., driver) in the seat provided with the air supply duct without an adverse influence on the comfort of the vehicle occupants.

Thus, according to an embodiment of the present invention, it is possible to provide an air purification device for a vehicle that can prevent an increase in the carbon dioxide concentration in the vehicle cabin for an extended period of time while suppressing the ventilation loss even when the air conditioner is in the inside air recirculation mode or not in operation, and that can supply purified air to around the face of a vehicle occupant (such as a driver) regardless of the physique of the occupant.

DESCRIPTION OF THE PREFERRED EMBODIMENT(S)

In the following, preferred embodiments of the present invention will be described in detail with reference to the drawings.

First Embodiment

Figure 1:
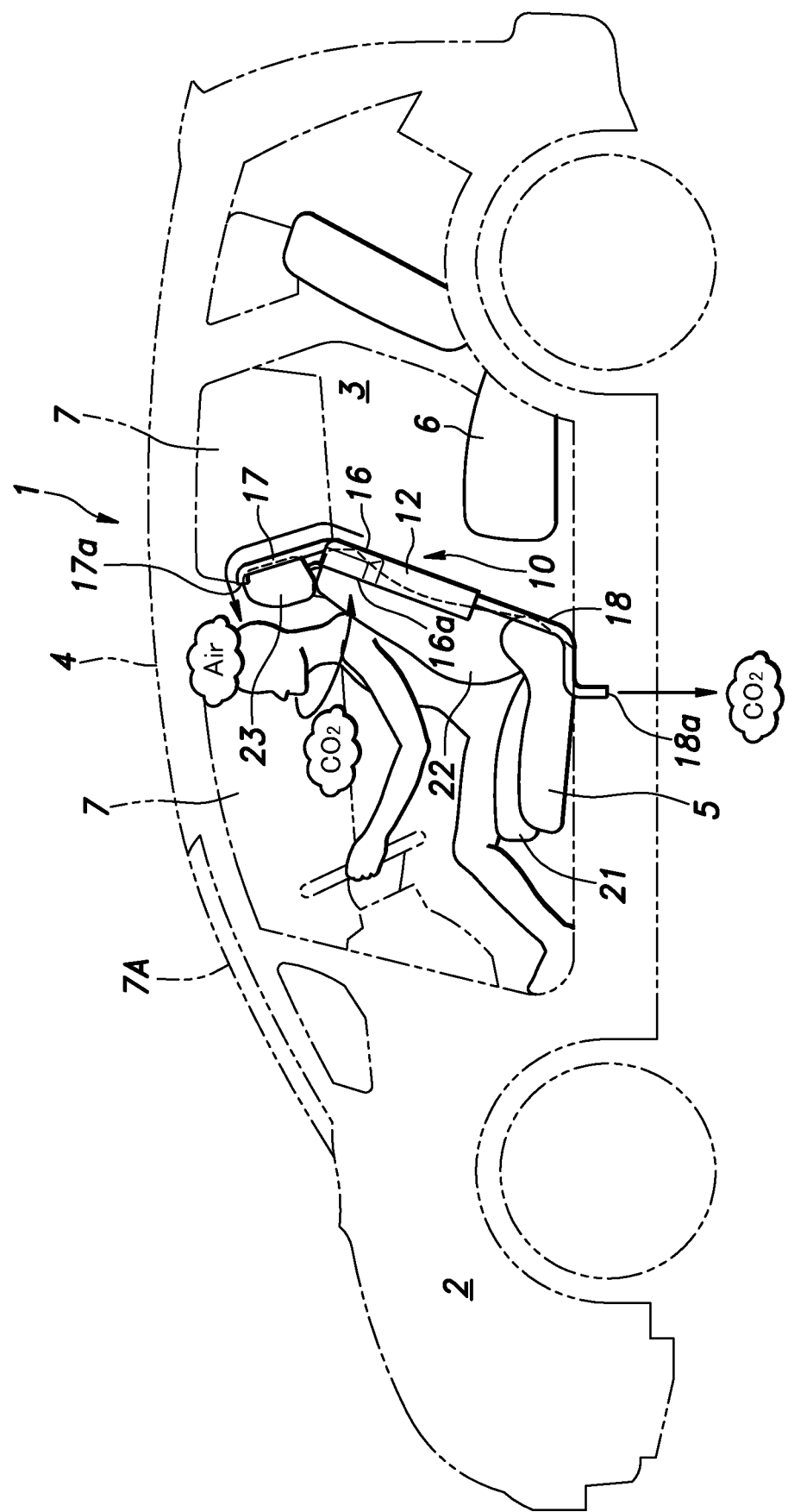
FIG. 1 is a side view of an automobile comprising an air purification device according to an embodiment of the present invention.
Figure 2:
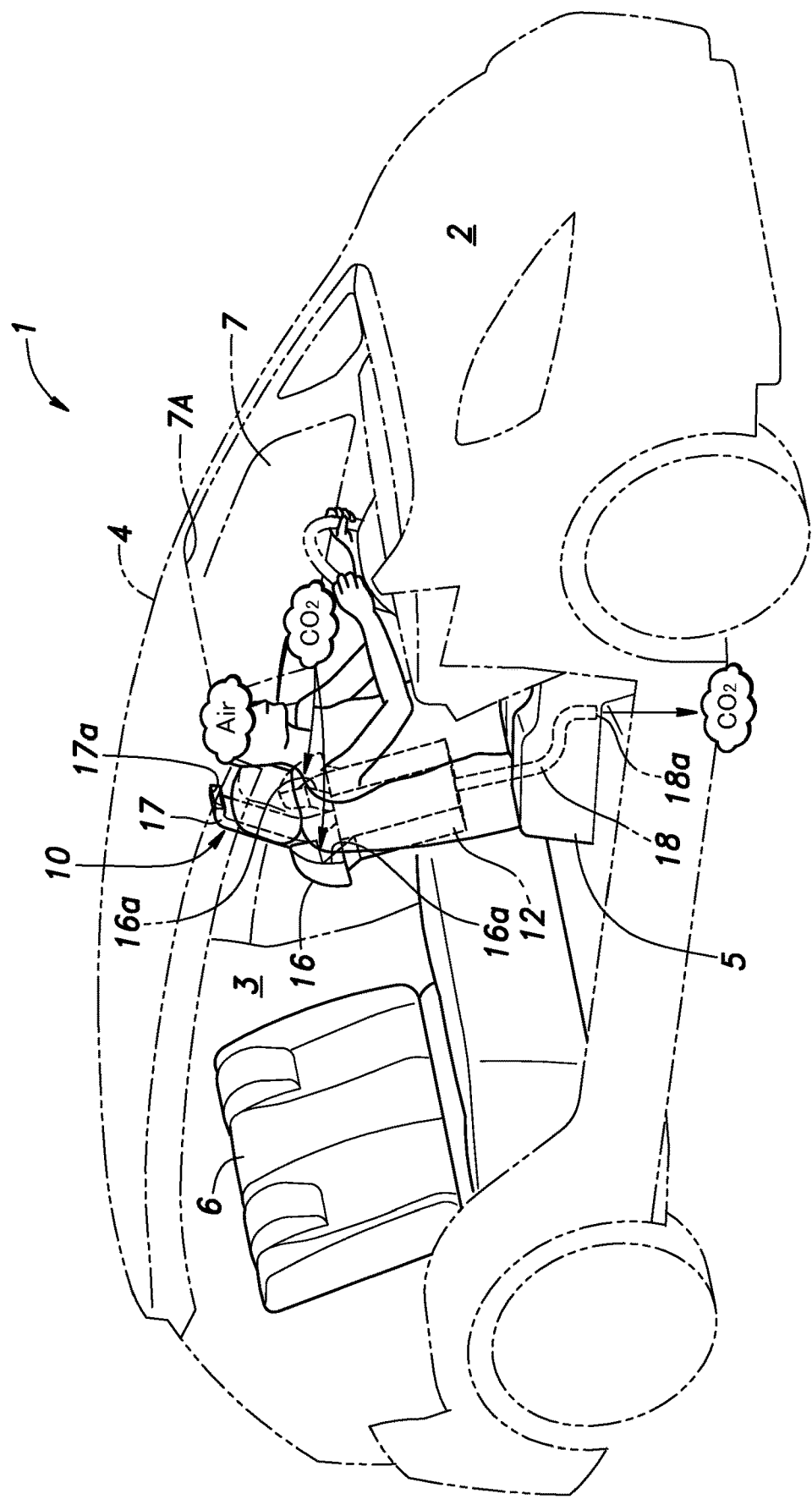
FIG. 2 is a perspective view of the automobile shown in FIG. 1.

First, with reference to FIGS. 1 to 3, a first embodiment of the present invention will be described. As shown in FIGS. 1 and 2, an automobile 1 includes a vehicle body 4 having an engine room 2 defined in a front part thereof and a vehicle cabin 3 defined behind the engine room 2. It is to be noted that when the automobile 1 is an electric car, the engine room 2 typically contains an electric motor, a power control unit for controlling the electric motor, a heat exchanger (radiator) for cooling the power control unit, etc. In a case where a plurality of electric motors are used to individually drive the wheels of the automobile 1, the electric motors may be disposed near the respective wheels outside the engine room 2.

The vehicle cabin 3 includes a passenger compartment where the driver and passengers are to be seated and a cargo space arranged behind the passenger compartment to be in communication with the passenger compartment. In the vehicle cabin 3, a pair of front seats (one of which is a driver's seat) 5 and a two or three-seater rear seat 6 are arranged in a fore and aft direction in two rows. An upper part of the vehicle body 4 is provided with a plurality of glass windows 7 including a windshield 7A. Further, the automobile 1 is equipped with an air purification device 10 for purifying the air in the vehicle cabin 3.

The air purification device 10 includes a carbon dioxide removal device 12 provided with an adsorbent (or absorbent) 11 (see FIG. 3) that, at a purification temperature, adsorbs (or absorbs) carbon dioxide in the air, and at a regeneration temperature higher than the purification temperature, releases (or desorbs) the adsorbed (or absorbed) carbon dioxide. In the present embodiment, the carbon dioxide removal device 12 is integrally mounted to the driver's seat 5.

The adsorbent 11 in the present embodiment consists of synthetic zeolite, which adsorbs carbon dioxide at a normal temperature (e.g., 0 to 30 degrees Celsius), and releases the adsorbed carbon dioxide at a regeneration temperature (e.g., 40 degrees Celsius) higher than the normal temperature. In the present description, the temperature at which the adsorbent 11 adsorbs carbon dioxide is referred to as a purification temperature. It is to be noted that the adsorbent (or absorbent) 11 that can be used in the present embodiment is not limited to synthetic zeolite, and may be any adsorbent or absorbent (summarily referred to as sorbent) having a property of releasing adsorbed (or absorbed) carbon dioxide at a temperature higher than the purification temperature, and may be liquid or solid. Examples that can be used as the adsorbent 11 (or absorbent) include activated carbon, zeolite, silica sand (silicon), barium orthotitanate, porous cerium oxide, polyamine, potassium carbonate, amine solution, amide-imide solution, alcohol solution, ether solution, ketone solution, carbonate solution, lactone solution, hydrocarbon solution, etc.

Synthetic zeolite, which is used as the adsorbent 11 in the present embodiment, has a property of adsorbing moisture (namely, water in the form of vapor (gas) or liquid) in the air at the purification temperature, and releasing the adsorbed moisture at the regeneration temperature. Namely, the adsorbent 11 adsorbs carbon dioxide and moisture simultaneously at the purification temperature, and releases carbon dioxide and moisture simultaneously at the regeneration temperature. Thus, the carbon dioxide removal device 12 serves as a carbon dioxide and moisture removal device.

Figure 3:
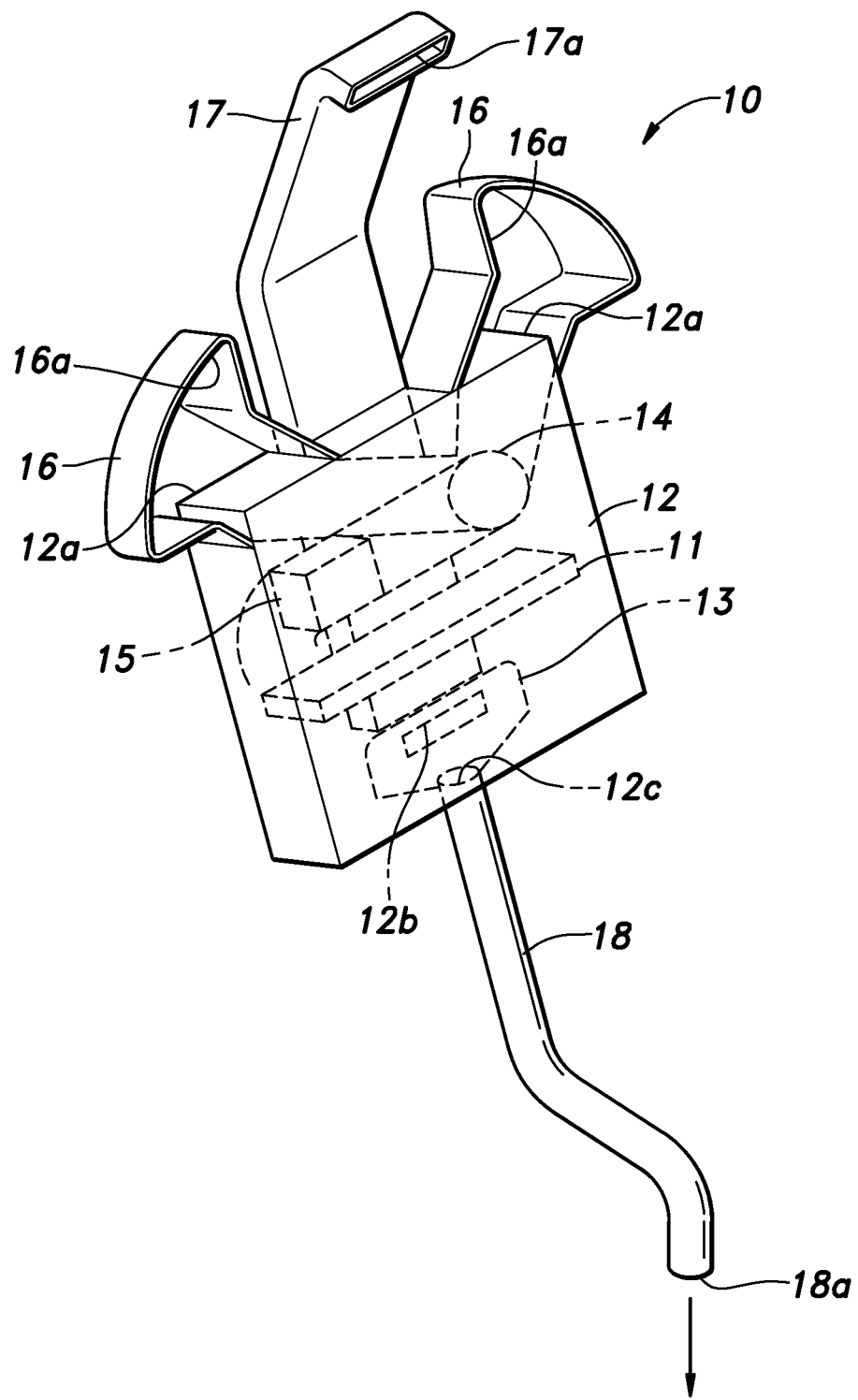
FIG. 3 is a perspective view of the air purification device shown in FIG. 1.

With additional reference to FIG. 3, the carbon dioxide removal device 12 is provided with a pair of inlets 12a for admitting air therein, and a first outlet 12b and a second outlet 12c for discharging air therefrom. The pair of inlets 12a are provided in upper left and upper right portions of the carbon dioxide removal device 12, respectively. Further, the carbon dioxide removal device 12 has a built-in three-way valve 13 (flow path switching damper) for selectively closing one of the first outlet 12b and the second outlet 12c, such that the air entering through the inlets 12a is discharged from the first outlet 12b or the second outlet 12c after flowing through the interior of the carbon dioxide removal device 12. The adsorbent 11 for adsorbing carbon dioxide in the air is provided in the form of a filter in a part of the carbon dioxide removal device 12 through which the air flows.

In a part of the carbon dioxide removal device 12 on a side of the inlets 12a with respect to the adsorbent 11, a blower 14 for sending air from the inlet 12a toward the first outlet 12b or the second outlet 12c and a heater 15 for heating the air are provided.

A pair of air intake ducts 16 are connected to the corresponding inlets 12a of the carbon dioxide removal device 12. Each of the air intake ducts 16 has one end formed with a suction opening 16a for sucking air in the vehicle cabin 3, and another end connected to the corresponding inlet 12a of the carbon dioxide removal device 12.

The air purification device 10 further includes an air supply duct 17 having one end connected to the first outlet 12b of the carbon dioxide removal device 12, and an exhaust duct 18 having one end connected to the second outlet 12c of the same. The other end of the air supply duct 17 is formed with a blowing opening 17a from which air is blown into the vehicle cabin 3, and the other end of the exhaust duct 18 is formed with an exhaust opening 18a from which air is discharged to the outside of the vehicle cabin 3.

As described above, the carbon dioxide removal device 12 is integrally mounted to the driver's seat (one of the front seats 5). Specifically, as shown in FIG. 1, the front seat (driver's seat) 5 has a seat cushion 21, a seat back 22 attached to the seat cushion 21 so as to be pivotable (reclinable), and a headrest 23 extending upward from an upper end of the seat back 22 and attached to the seat back 22 such that the height of the headrest 23 is adjustable. The carbon dioxide removal device 12 is mounted to a rear side of the seat back 22 of the front seat 5. In the illustrated embodiment, the carbon dioxide removal device 12 is exposed on the rear side of the seat back 22, but the carbon dioxide removal device 12 may be covered with a cover member of the seat back 22.

As also shown in FIG. 2, each air intake duct 16 extends from the corresponding inlet 12a of the carbon dioxide removal device 12 obliquely upward and outward (outward in the vehicle width direction), such that the suction opening 16a faces forward and at least a part of the suction opening 16a is located above an upper edge of the seat back 22 on a lateral side of the headrest 23. Though not shown in the drawings, the suction opening 16a is provided with a filter for preventing intrusion of dust.

When the air volume of an air conditioner for controlling the temperature in the vehicle cabin 3 is small, the air exhaled by the driver stays around the face of the driver for a while, though carbon dioxide in the exhaled air tends to move to the lower part of the vehicle cabin 3 as carbon dioxide is denser than air. Particularly, when the air conditioner is in heating operation, the user (vehicle occupant) often selects a heat mode (HEAT) in which warmed air is blown toward the feet of the user or a heat/defog mode (H/D) in which warmed air is blown toward the feet of the user and toward the windshield, and in such cases, air in the vehicle cabin 3 tends to stagnate, and hence, the exhaled air tends to stay around the face of the driver. As described above, in the present embodiment, the suction opening 16a of each air intake duct 16 opens forward on a lateral side of the headrest 23, whereby the driver's exhaled air, which has a high carbon dioxide concentration, can be effectively sucked into the air intake duct 16.

The air supply duct 17 extends upward from the first outlet 12b behind the headrest 23, such that the blowing opening 17a opens forward in a part of the vehicle cabin 3 above an upper edge of the headrest 23. The air supply duct 17 is provided so as to be moveable relative to the carbon dioxide removal device 12 in a vertical direction (in a direction of extension of a pillar of the headrest 23 provided substantially in parallel with a rear surface of the seat back 22 (namely, in a sliding direction of the headrest 23)), and is fixed to the headrest 23 at an upper part thereof. Therefore, when the driver adjusts the position of the headrest 23 to a height suitable to the physique of the driver by moving the headrest 23 up or down, the air supply duct 17 also is moved up or down together with the headrest 23 so that the position of the blowing opening 17a is adjusted to a height suitable to the physique of the driver.

The exhaust duct 18 extends downward from the second outlet 12c and passes through the vehicle body 4, such that the exhaust opening 18a is located outside the vehicle cabin 3 below the vehicle body 4.

The automobile 1 is provided in an appropriate part thereof with an in-cabin CO2 sensor 31 (FIG. 1) that detects the carbon dioxide concentration in the vehicle cabin 3. Further, the automobile 1 is provided with a controller 32 (FIG. 1) for controlling an operation of the carbon dioxide removal device 12 by drive-controlling the three-way valve 13, the blower 14, and the heater 15 in accordance with an output of the in-cabin CO2 sensor 31.

When the carbon dioxide concentration in the vehicle cabin 3 detected by the in-cabin CO2 sensor 31 reaches a predetermined value, the controller 32 controls the carbon dioxide removal device 12 in a purification mode, in which air in the vehicle cabin 3 is sent into the carbon dioxide removal device 12 at the purification temperature, and the purified air from which moisture and carbon dioxide have been removed by the adsorbent 11 is blown into the vehicle cabin 3. Specifically, when executing the purification mode, the controller 32 controls the three-way valve 13 to close the exhaust duct 18 and open the air supply duct 17, and drives the blower 14 without driving the heater 15.

Further, the controller 32 estimates a state of adsorption of carbon dioxide by the adsorbent 11 based on the detection value of the in-cabin CO2 sensor 31 and the operating time of the carbon dioxide removal device 12 in the purification mode. It is to be noted here that the carbon dioxide adsorption state can be represented by a ratio of an amount of CO2 currently adsorbed (or held) by the adsorbent 11 to the maximum amount of CO2 that can be adsorbed by the adsorbent 11. When the estimated carbon dioxide adsorption state reaches a predetermined threshold value (e.g., 95%), the controller 32 controls the carbon dioxide removal device 12 in a regeneration mode, in which air heated to the regeneration temperature is sent into the carbon dioxide removal device 12, and exhaust air containing carbon dioxide released from the adsorbent 11 is discharged to the outside of the vehicle cabin 3. Specifically, when executing the regeneration mode, the controller 32 controls the three-way valve 13 to close the air supply duct 17 and open the exhaust duct 18, and drives the heater 15 and the blower 14 such that the temperature of the air sent to the adsorbent 11 is raised to the regeneration temperature (e.g., 40 degrees Celsius).

As described above, in the purification mode, air in the vehicle cabin 3 is sucked through the suction opening 16a of each air intake duct 16 into the carbon dioxide removal device 12, where carbon dioxide is removed from the air, and the purified air is blown from the blowing opening 17a of the air supply duct 17 into the vehicle cabin 3. In the regeneration mode, the carbon dioxide adsorbed by the carbon dioxide removal device 12 is discharged from the exhaust opening 18a of the exhaust duct 18 to the outside of the vehicle cabin 3. Therefore, even when the air conditioner is in the inside air recirculation mode or not in operation, it is possible to prevent an increase in the carbon dioxide concentration in the vehicle cabin 3 for an extended period of time. In addition, because in the purification mode the air in the vehicle cabin 3 is not discharged to the outside of the vehicle cabin 3, the ventilation loss can be suppressed.

Further, because the air supply duct 17 is mounted to the front seat (driver's seat) 5 so as to be movable vertically with the blowing opening 17a facing forward, purified air from which carbon dioxide has been removed can be supplied to around the face of the driver regardless of the physique of the driver.

In the present embodiment, an upper part of the air supply duct 17 where the blowing opening 17a is formed is fixed to the headrest 23 of the front seat (driver's seat) 5. Therefore, when the driver adjusts the height of the headrest 23 to suit the physique of the driver, the height of the upper part (blowing opening 17a) of the air supply duct 17 fixed to the headrest 23 is also adjusted to suit the physique of the driver. Therefore, there is no need to separately adjust the height of the blowing opening 17a.

Further, because the blowing opening 17a opens forward at a position above the headrest 23, purified air from which carbon dioxide has been removed by the carbon dioxide removal device 12 can be supplied to a region in front of the face of the driver from above.

Also, because the air intake ducts 16 are provided on respective sides of the seat back 22 of the front seat (driver's seat) 5 and the suction openings 16a of these air intake ducts 16 open forward, the air exhaled by the driver, which has a high carbon dioxide concentration, is sucked through the suction openings 16a, whereby carbon dioxide can be removed efficiently from the air in the vehicle cabin 3.

In addition, because the carbon dioxide removal device 12 is mounted to the seat back 22 of the front seat 5, the carbon dioxide removal device 12 can be installed in the vehicle body 4 by installing the front seat 5 in the vehicle body 4. Therefore, the number of steps for installing component parts in the automobile 1 can be reduced.

Second Embodiment

Figure 4:
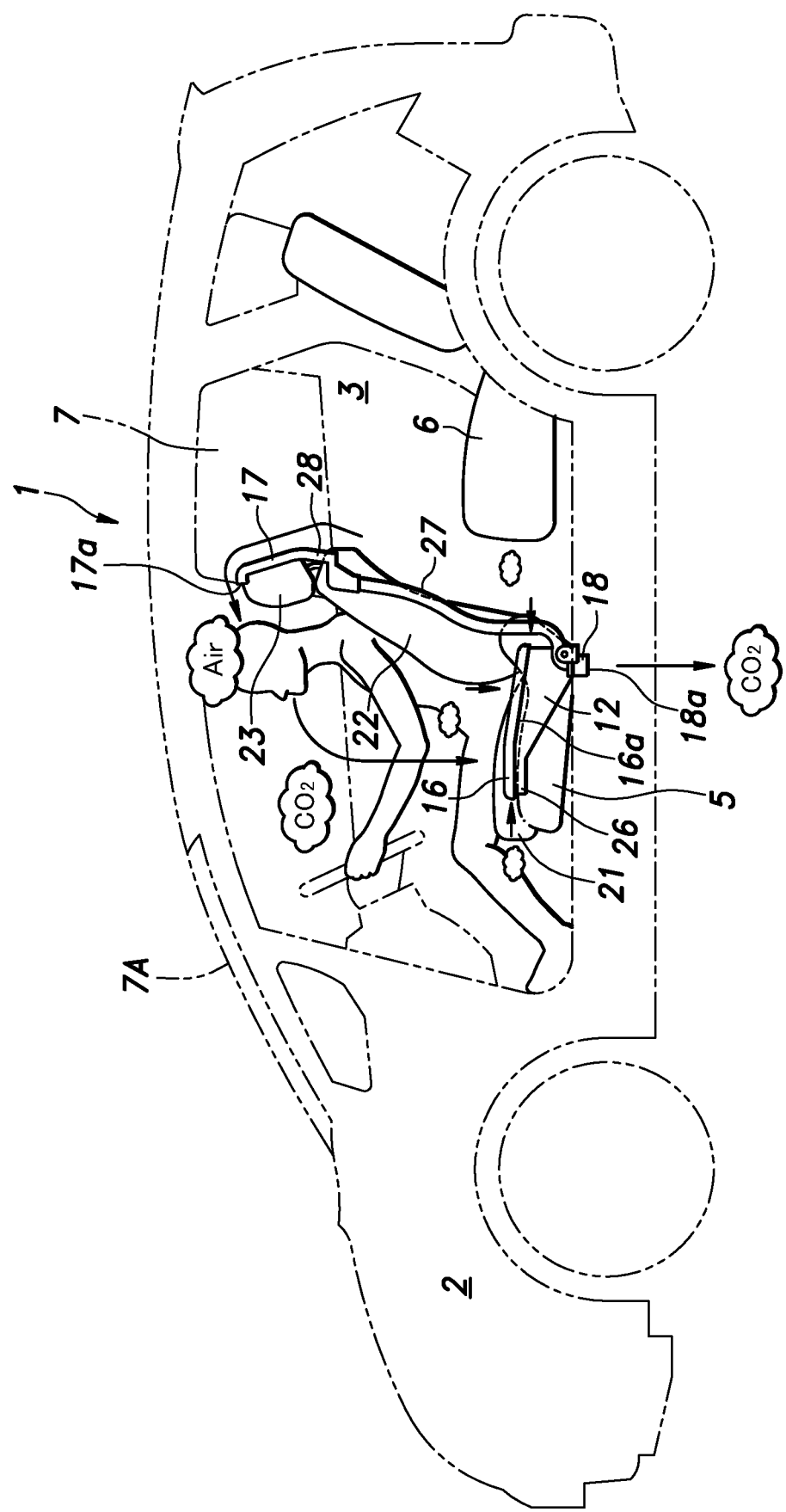
FIG. 4 is a side view of an automobile comprising an air purification device according to a second embodiment of the present invention.
Figure 5:
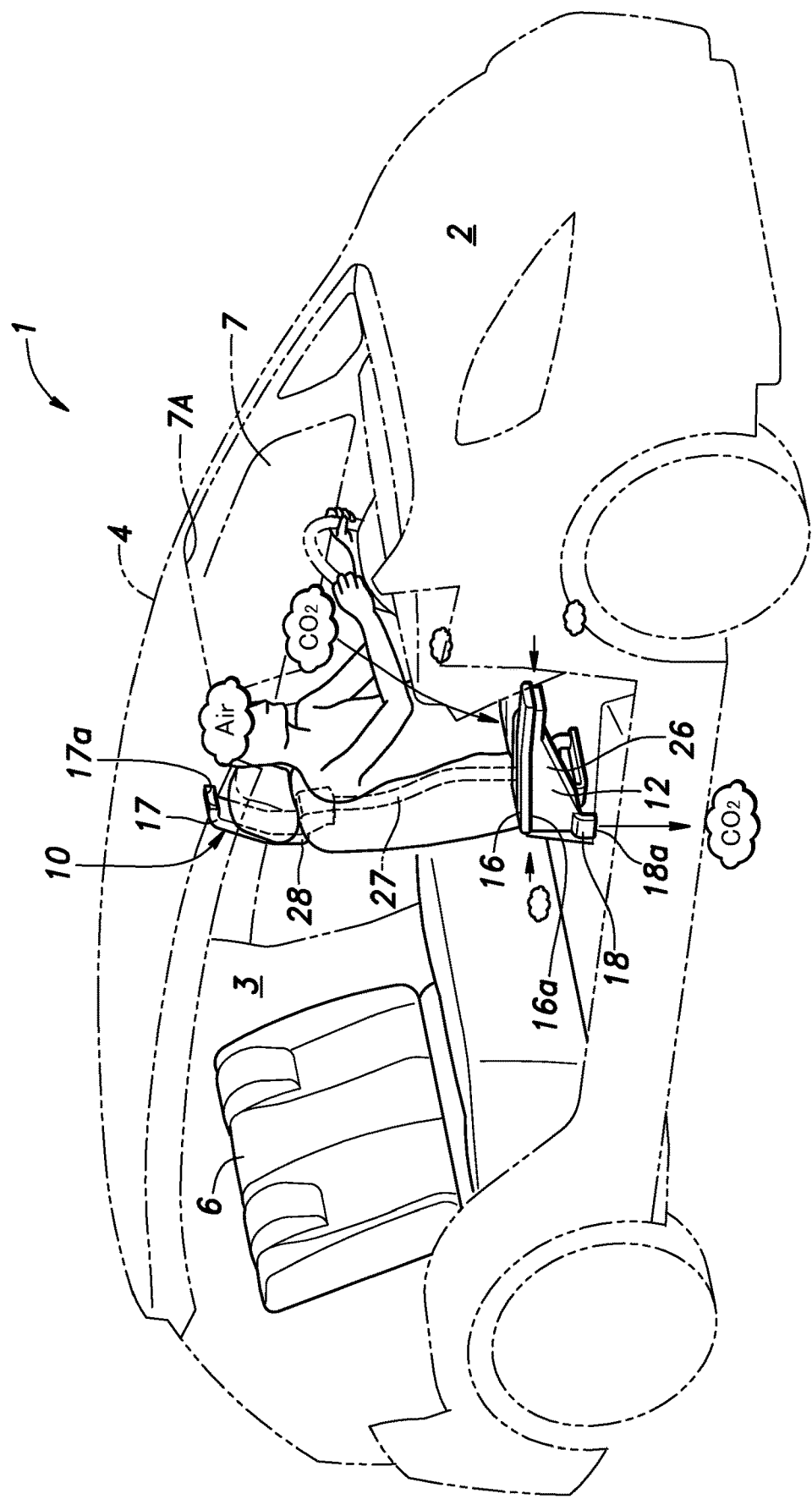
FIG. 5 is a perspective view of the automobile shown in FIG. 4.
Figure 6:
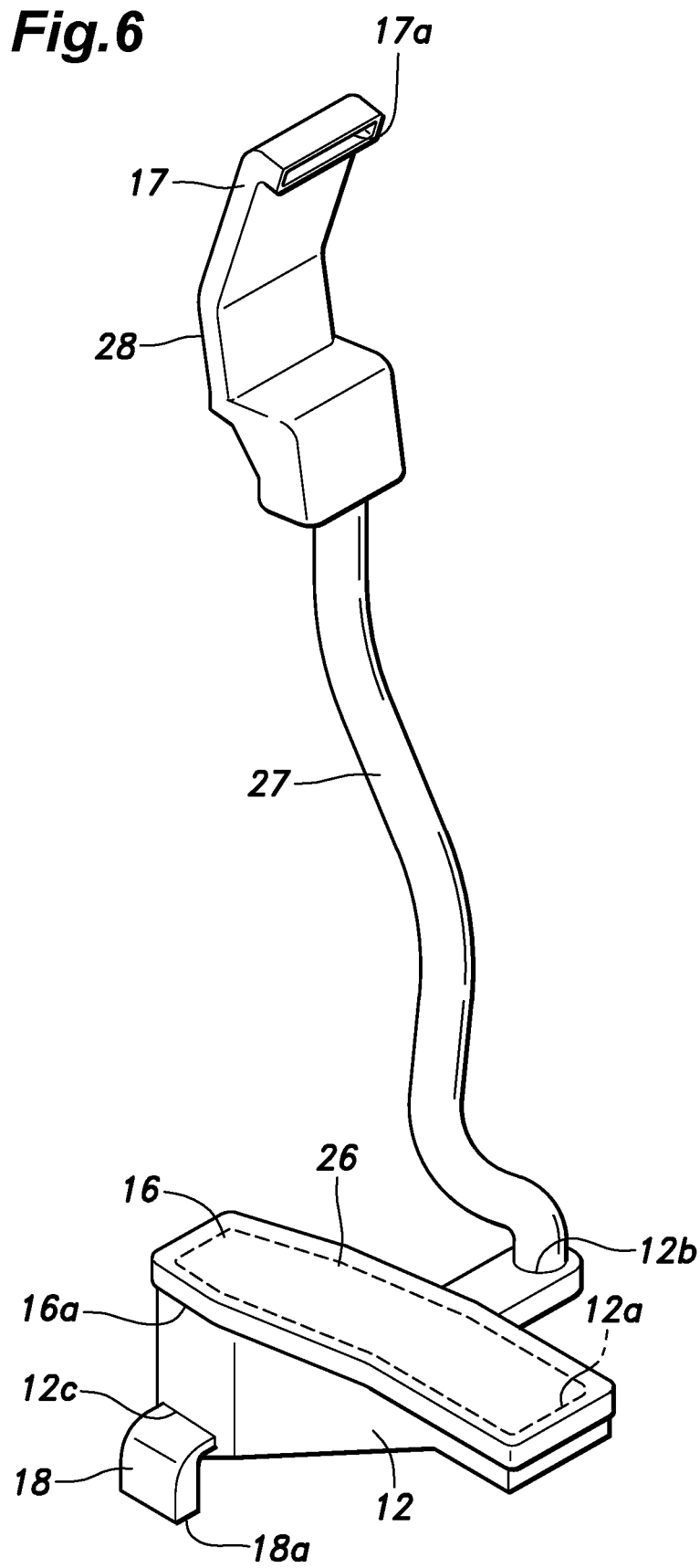
FIG. 6 is a perspective view of the air purification device shown in FIG. 4.

Next, with reference to FIGS. 4 to 6, a second embodiment of the present invention will be described. In the description of the second embodiment, elements same as or similar to those of the first embodiment will be denoted by the same reference signs and a redundant explanation will be omitted.

In the air purification device 10 according to the second embodiment, the carbon dioxide removal device 12 is integrally provided in a center console 26 (or constitutes the center console 26) located between the driver's seat and the front passenger seat (namely, between the two front seats 5), instead of being mounted to the driver's seat (one of the front seats 5).

The carbon dioxide removal device 12 of the second embodiment differs from that of the first embodiment in that the carbon dioxide removal device 12 of the second embodiment is formed to have a shape in conformity with the center console 26. Further, in the carbon dioxide removal device 12 of the second embodiment, the inlet 12a for air is formed in a substantially entire part of the top surface of the carbon dioxide removal device 12, and a lid-like member provided to cover the inlet 12a constitutes the air intake duct 16. The air intake duct 16 has a peripheral wall depending from a peripheral part thereof to surround an outer surface of the carbon dioxide removal device 12 such that the suction opening 16a is defined between the peripheral wall of the air intake duct 16 and the outer circumferential surface of the carbon dioxide removal device 12. The suction opening 16a extends circumferentially and opens downward over the entire circumference of the carbon dioxide removal device 12. The suction opening 16a also opens rearward on a rear side of the carbon dioxide removal device 12.

The air supply duct 17 includes a hose portion (upstream portion) 27 connected to the first outlet 12b of the carbon dioxide removal device 12 and a duct portion 28 joined to the downstream end of the hose portion 27 and fixed to the headrest 23 of the front seat 5 serving as the driver's seat. The hose portion 27 has flexibility such that when the driver adjusts the height of the headrest 23 to suit the physique of the driver, the height of the duct portion 28 fixed to the headrest 23 is allowed to be adjusted at the same time.

The exhaust duct 18 extends laterally from the second outlet 12c formed in a right surface of the carbon dioxide removal device 12 and is curved to extend downward such that the exhaust duct 18 passes through the vehicle body 4 and the exhaust opening 18a opens outside the vehicle cabin 3 below the vehicle body 4.

As described above, carbon dioxide contained in the air exhaled from a vehicle occupant such as the driver has a higher density than air, and therefore, tends to accumulate in a lower part of the vehicle cabin 3. In the second embodiment, the air intake duct 16 is provided in the center console 26, and the suction opening 16a opens downward. Owing to such an arrangement, carbon dioxide contained in the air exhaled from the driver in the driver's seat or from the occupant in the front passenger seat is sucked through the suction opening 16a of the air intake duct 16 provided in the center console 26, whereby carbon dioxide can be removed efficiently from the air in the vehicle cabin 3.

Further, because the suction opening 16a of the air intake duct 16 opens rearward on the rear side of the center console 26, the air exhaled from the occupants in the rear seat 6 also can be sucked through the suction opening 16a.

In addition, in the second embodiment, because the carbon dioxide removal device 12 is provided in the center console 26 (or constitutes the center console 26), the carbon dioxide removal device 12 can be installed in the vehicle body 4 by installing the center console 26 in the vehicle body 4. Therefore, the number of steps for installing component parts in the automobile 1 can be reduced. Further, because the carbon dioxide removal device 12 is not mounted to the seat back 22 of the front seat (driver's seat) 5, the carbon dioxide removal device 12 is prevented from being a nuisance to an occupant in the rear seat 6, and an increase in size of the seat back 22 of the front seat 5 and a reduction in the cushioning performance of the same are avoided. Namely, it is possible to supply purified air to around the face of the driver without an adverse influence on the comfort of the vehicle occupants.

The concrete embodiments of the present invention have been described in the foregoing, but the present invention is not limited to the embodiments and may be modified in various ways.

For example, in the above embodiments, the air purification device 10 was installed in the hatchback-type automobile 1 in which a rear part of the vehicle cabin 3 forms a cargo space, but the air purification device 10 may be installed in a sedan-type or coupe type automobile having a cargo room separate from the vehicle cabin 3 (namely, the vehicle cabin 3 consists of a passenger compartment).

Further, in the aforementioned second embodiment, the suction opening 16a of the air intake duct 16 was formed to open downward over an entire circumference of the carbon dioxide removal device 12, but the suction opening 16a may be formed only in a part of an outer circumference of the carbon dioxide removal device 12. Yet further, the suction opening 16a of the air intake duct 16 may be formed to face forward. In such a case also, similar effects as in the second embodiment may be obtained.

In addition, though in the above embodiments the controller 32 drives only the blower 14 without driving the heater 15 when controlling the carbon dioxide removal device 12 in the purification mode, the controller 32 may drive the heater 15 together with the blower 14 to heat air to be purified to a temperate appropriate for the adsorbent 11 to adsorb carbon dioxide.

In the above embodiments, the adsorbent 11 adsorbs carbon dioxide and moisture simultaneously and releases them simultaneously, but in another embodiment, the adsorbent 11 may adsorb only carbon dioxide, and an additional adsorbent for adsorbing moisture may be prepared separately from the adsorbent for adsorbing carbon dioxide. Further, the adsorption temperature for carbon dioxide and the adsorption temperature for moisture may differ from each other, and the release temperature for carbon dioxide and the release temperature for moisture may differ from each other.

The concrete structure, arrangement, number, material, etc. of the component parts of the embodiments may be appropriately changed within the scope of the present invention. Also, not all of the component parts shown in the foregoing embodiments are necessarily indispensable, and they may be selectively used as appropriate.

The invention claimed is:

1. An air purification device for a vehicle, comprising:
   an air intake duct having one end formed with a suction opening for sucking air in a vehicle cabin;
   a carbon dioxide removal device that has an inlet connected to another end of the air intake duct and sorbs and removes carbon dioxide contained in air supplied through the inlet;
   an air supply duct having one end connected to a first outlet of the carbon dioxide removal device and an other end formed with a blowing opening for blowing purified air from which carbon dioxide has been removed by the carbon dioxide removal device into the vehicle cabin; and
   an exhaust duct having one end connected to a second outlet of the carbon dioxide removal device and another end formed with an exhaust opening for discharging the carbon dioxide sorbed by the carbon dioxide removal device to outside of the vehicle cabin,
   wherein the air supply duct is mounted to a seat so as to be movable vertically with the blowing opening facing forward; and
   wherein the air intake duct includes a pair of air intake ducts provided on respective sides of a seat back of the seat, and the suction opening of each air intake duct opens forward.

2. The air purification device for a vehicle as defined in claim 1, wherein the other end of the air supply duct is fixed to a headrest of the seat.

3. The air purification device for a vehicle as defined in claim 2, wherein the blowing opening opens forward above the headrest.

4. The air purification device for a vehicle as defined in claim 1, wherein the carbon dioxide removal device is mounted to the seat back of the seat.

5. An air purification device for a vehicle comprising:
   an air intake duct having one end formed with a suction opening for sucking air in a vehicle cabin;
   a carbon dioxide removal device that has an inlet connected to another end of the air intake duct and sorbs and removes carbon dioxide contained in air supplied through the inlet;
   an air supply duct having one end connected to a first outlet of the carbon dioxide removal device and another end formed with a blowing opening for blowing purified air from which carbon dioxide has been removed by the carbon dioxide removal device into the vehicle cabin; and
   an exhaust duct having one end connected to a second outlet of the carbon dioxide removal device and another end formed with an exhaust opening for discharging the carbon dioxide sorbed by the carbon dioxide removal device to outside of the vehicle cabin,
   wherein the air intake duct is provided in a center console, and the suction opening extends circumferentially and opens downward over the entire circumference of the carbon dioxide removal device.

6. The air purification device for a vehicle as defined in claim 5, wherein the suction opening further opens rearward.

7. The air purification device for a vehicle as defined in claim 5, wherein the carbon dioxide removal device is provided in the center console.

* * * * *